Patented July 31, 1951

2,562,223

UNITED STATES PATENT OFFICE 2,562,223

ARYLSULFONYL DERIVATIVES OF PTEROYLGLUTAMIC ACID AND INTERMEDIATES THEREFOR

David I. Weisblat and Barney J. Magerlein, Kalamazoo, Mich., assignors to The Upjohn Company, Kalamazoo, Mich., a corporation of Michigan No Drawing. Application July 31, 1948,
Serial No. 41,887

11 Claims. (Cl. 260—251.5)

This invention relates to N'-(N-((2-amino-4-hydroxy-6-pteridyl)methyl)-arylsulfonyl-p-aminobenzoyl)-glutamic acid compounds and to methods and intermediate compounds useful in their preparation.

The N'-(N-((2-amino-4-hydroxy-6-pteridyl)methyl)-arylsulfonyl-p-aminobenzoyl)-glutamic acid compounds have the generic formula

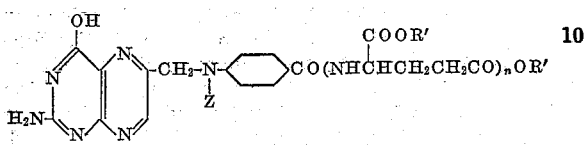

wherein R' is from the group consisting of hydrogen and the alkyl radicals, Z is an arylsulfonyl radical and $n$ is an integer from the group 1 to 7, inclusive.

In the naming of compounds of the invention when both a glutamic acid residue and a p-aminobenzoic acid residue are included in the molecule, the nitrogen atom of the glutamic acid residue is, for convenience, herein referred to by the symbol "N'" and the nitrogen atom of the p-amino-benzoic acid residue is referred to by the symbol "N". As indicated by the formula given, compounds containing more than one glutamic acid or ester residue contemplated by the invention are those wherein only the gamma-carboxyl groups are involved in the peptide linkages.

The method and intermediate compounds of the invention are of value in the preparation of certain compounds of the group known in the art as "folic acids" which have been isolated from natural sources. Thus, N'-(N-((2-amino-4-hydroxy-6-pteridyl)methyl)-p-aminobenzoyl)-glutamic acid (pteroylglutamic acid), wherein the glutamic acid residue has the same configuration as l(+)-glutamic acid and which can be prepared readily by splitting the p-toluenesulfonyl group from N'-(N-((2-amino-4-hydroxy-6-pteridyl)methyl)-p-toluenesulfonyl-p-aminobenzoyl)-glutamic acid, as hereinafter described, appears to be identical with the so-called "L. casei factor" or vitamin Bc isolated from liver. Other compounds of the same general nature, but having two or more glutamic acid residues connected through the gamma-carboxyl group which can be prepared by splitting the arylsulfonyl radical from still other N'-(N-((2-amino-4-hydroxy-6-pteridyl)-methyl)-arylsulfonyl-p-aminobenzoyl)-glutamic acids or esters appear to be identical with and to have the same biological activity of still other members of the folic acid group. The value of methods and intermediates useful in preparing these and related compounds synthetically is apparent.

The reactions involved in the method of the invention are indicated in the accompanying diagram.

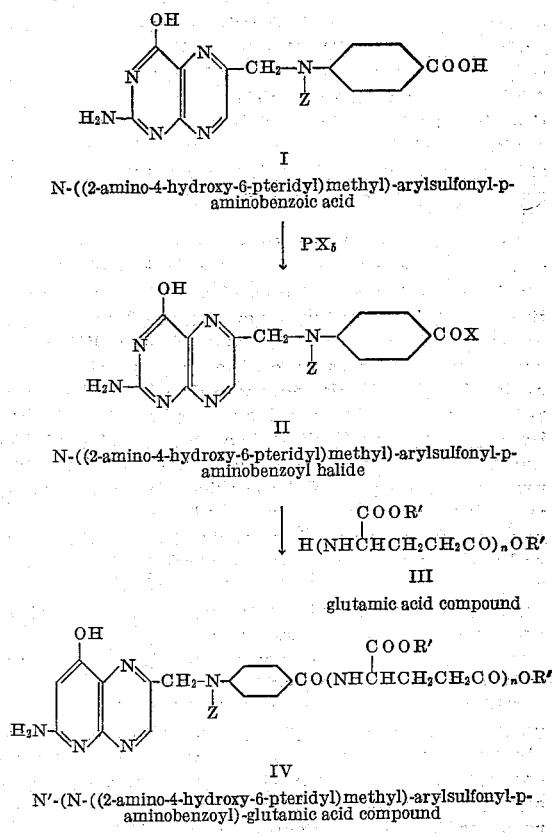

I

N-((2-amino-4-hydroxy-6-pteridyl)methyl)-arylsulfonyl-p-aminobenzoic acid

↓ PX₅

II

N-((2-amino-4-hydroxy-6-pteridyl)methyl)-arylsulfonyl-p-aminobenzoyl halide

↓ H(NHCHCH₂CH₂CO)ₙOR'
      III
glutamic acid compound

IV

N'-(N-((2-amino-4-hydroxy-6-pteridyl)methyl)-arylsulfonyl-p-aminobenzoyl)-glutamic acid compound According to the method of the invention an N-((2-amino-4-hydroxy-6-pteridyl)methyl)-arylsulfonyl-p-aminobenzoic acid (I) is first treated with a phosphorus pentahalide to convert it to the corresponding N-((2-amino-4-hydroxy-6-pteridyl)methyl)-arylsulfonyl-p-aminobenzoyl halide (II) which is subsequently condensed with a glutamic acid compound (III) to give the desired N'-(N-((2-amino-4-hydroxy-6-pteridyl)-methyl)-arylsulfonyl-p-aminobenzoyl)-glutamic acid compound (IV). In the diagram, R', Z and $n$ have the values previously mentioned and the halogen (X) can be chlorine or bromine.

The N-((2-amino-4-hydroxy-6-pteridyl)methyl)-arylsulfonyl-p-aminobenzoic acid used as starting material in the present process can be prepared in any convenient way, one way being by the reaction of an arylsulfonyl halide, i. e. a chloride or bromide, with N-((2-amino-4 - hydroxy-6-pteridyl)methyl)-p-aminobenzoic acid. The latter compound can be prepared readily by the method described and claimed in a co-pending application, Serial No. 32,528. According to the method of the co-pending application, 2,4,5 - triamino-6-hydroxypyrimidine is first condensed with dihydroxy-acetone to form 2 - amino-4-hydroxy-6-hydroxymethyl-pteridine which is then converted by treatment with a hydrogen halide, i. e. with hydrogen bromide or hydrogen chloride, to the corresponding 2-amino-4-hydroxy-6-halomethyl-pteridine. The latter compound is then condensed with p-aminobenzoic acid to form the N-((2 - amino-4 - hydroxy-6-pteridyl)methyl)-p-aminobenzoic acid. Other ways of preparing the N-((2-amino-4-hydroxy-6 - pteridyl)methyl) - arylsulfonyl - p - aminobenzoic acids are described and claimed in a concurrently filed co-pending application, Serial No. 41,882.

The N-((2-amino-4-hydroxy - 6 - pteridyl)-methyl-arylsulfonyl-p-aminobenzoic acids used in the process can contain substantially any arylsulfonyl radical with the formation of the corresponding intermediate and final products. Arylsulfonyl radicals which may be present in the starting material and in the ensuing intermediate and final products include the benzenesulfonyl, p-toluenesulfonyl, o-toluenesulfonyl and naphthalenesulfonyl radicals, as well as many others.

Due to the ready availability and low cost of the p-toluenesulfonyl halides, and to the higher yields of amine sometimes obtained when splitting a p-toluenesulfonyl derivative of an amine, as hereinafter described, than when splitting a compound of the same amine and certain other arylsulfonyl radicals, compounds containing the p-toluenesulfonyl radical are preferred, but the invention is not limited thereto. It should be mentioned also that the method involved in the present invention can be carried out, and corresponding compounds prepared, using starting compounds wherein the arylsulfonyl group or radical is replaced by an alkylsulfonyl, aralkylsulfonyl or cycloalkylsulfonyl group, such as the methanesulfonyl, alpha-toluenesulfonyl or cyclohexylsulfonyl groups, respectively. The invention will, however, be described with particular reference to p-toluenesulfonyl compounds.

Glutamic acid compounds (III) which can be used in the method of the invention comprise glutamic acid, gamma-glutamylglutamic acid, gamma-glutamyl-gamma-glutamylglutamic acid and the like having from 1 to 7 glutamic acid residues in the molecule linked through the gamma-carboxyl groups, and their alkyl esters. Although the invention will be described in the case of esters with particular reference to the ethyl esters, it is understood that other alkyl esters, such as the methyl, propyl, iso-propyl, butyl, tert.-butyl, hexyl, nonyl and dodecyl esters, can be used with equal facility, if desired.

Compounds similar to or identical with those of the folic acid group made by using the intermediates or methods of the invention, such as pteroylglutamic acid and pteroylgamma-glutamyl-gamma-glutamylglutamic acid, which are of greatest value as measured by their biological activity against *Lactobacillus casei* or *Streptococcus fecalis* R, are those wherein the glutamic acid residues possess the same configuration as l(+)-glutamic acid and for this reason the preferred compounds of the invention are those having the same configuration. However, the invention also contemplates compounds having the dextro configuration as well as racemic mixtures.

The reaction of an N-((2-amino-4-hydroxy-6-pteridyl)methyl)arylsulfonyl - p - aminobenzoic acid with a phosphorus pentahalide is carried out conveniently by refluxing a mixture of approximately equi-molecular quantities of the two substances. Refluxing is usually carried on for from several minutes to a few hours, during which time hydrogen halide is evolved. A phosphorous oxyhalide can be used as a diluent, if desired. The mixture is then evaporated in vacuo to remove excess phosphorus pentahalide and the phosphorus oxyhalide formed during the reaction as well as that added as a diluent. The N-((2-amino-4-hydroxy - 6 - pteridyl)methyl) - arylsulfonyl-p-aminobenzoyl halide remains as an oily or solid residue which is generally sufficiently pure for use in the second step of the process without further treatment.

The reaction of an N-((2-amino-4-hydroxy-6-pteridyl)methyl)arylsulfonyl - p - aminobenzoyl halide with a glutamic acid compound is carried out conveniently by agitating a mixture of these substances, preferably in about equi-molecular proportions, with at least approximately the theoretical amount of dilute aqueous sodium hydroxide or other aqueous alkali necessary to combine with the hydrogen halide formed. In the case of a glutamic acid compound which is an acid, sufficient alkali should be used to form the salt of the glutamic acid compound and in the case of glutamic acid compounds which are esters, care should be taken to avoid the use of an excess of too strong an alkali or of unduly high temperatures to prevent hydrolysis of the ester groups, unless such hydrolysis is desired. By using more vigorous reaction conditions, such ester groups can be hydrolyzed concurrently with the reaction of the acid halide with the glutamic acid compound, if desired.

The reaction is usually affected by agitating a mixture of the acid halide, the glutamic acid compound and the aqueous alkali at ordinary room temperatures although higher temperatures can be employed, if desired. The reaction is usually substantially complete in from about 30 minutes to about 2 hours at ordinary temperatures and proceeds somewhat more rapidly at elevated temperatures. The reaction mixture is then acidified, preferably to a pH of about 3, and the precipitate collected, washed and dried. The N'-(N-((2-amino-4-hydroxy - 6 - pteridyl)meth - yl)-arylsulfonyl-p-aminobenzoyl)-glutamic acid compound is thus obtained as an amorphous solid which can, if desired, be purified by decolorization and reprecipitation from dilute alkali. Esters formed by using a glutamic acid ester can be hydrolyzed to the corresponding acids with alkalies, if desired.

The splitting of an arylsulfonyl radical from an N'-(N-((2-amino - 4 - hydroxy - 6 - pteridyl) - methyl)-arylsulfonyl-p-aminobenzoyl) - glutamic acid compound can be accomplished according to the method described and claimed in a concurrently filed co-pending application, Serial No. 41,883. According to the method of the co-pending application, the arylsulfonylamino compound is treated, usually at ordinary temperatures, with hydrogen bromide and a bromine acceptor, such as phenol, catechol, naphthol or the like, in an aliphatic acid medium such as acetic acid. The mixture is allowed to stand for from one to several hours during which time the arylsulfonyl radical is split from the molecule. The presence of the bromine acceptor in the reaction mixture serves to prevent bromination in the benzene nucleus of the arylamine, such as invariably occurs during the reaction when the bromine acceptor is omitted. The hydrobromide of the amine can be isolated in high yield by pouring the reaction mixture into ether whereupon the hydrobromide separates in crystalline form. In this way, a diethyl N'-(N-((2-amino-4-hydroxy-6-pteridyl)methyl) - aryl - sulfonyl - p - aminobenzoyl)-glutamate can be converted readily and in high yield to diethyl N'-(N-((2-amino-4-hydroxy-6-pteridyl)methyl)-p-aminobenzoyl)-glutamate. The latter ester can, if desired, be hydrolyzed readily to the corresponding dicarboxylic acid. Other sulfonylamino acids or esters can be converted to the respective amines in similar manner.

Certain advantages of the invention are apparent from the following examples which are given by way of illustration only and are not to be construed as limiting.

*Example 1.—2-amino -4- hydroxy - 6 - hydroxy - methyl-pteridine*

One hundred twenty milligrams of dihydroxyacetone was added to a filtered solution of 100 milligrams of 2,4,5-triamino-6-hydroxypyrimidine in 15 milliliters of normal aqueous acetic acid and the solution was heated on the steam bath. The color changed from pink through yellow to orange in the course of several minutes and crystals began to separate. After heating for twenty minutes the mixture was cooled and filtered. Thirty milligrams of crystalline 2-amino-4-hydroxy-6-hydroxymethyl-pteridine was thus obtained. The filtrate was cooled over night in a refrigerator and an additional 20 milligrams of the hydroxymethyl compound was obtained upon filtering.

An additional 100 milligrams of dihydroxyacetone was added to the filtrate from the hydroxymethyl compound and the mixture heated and cooled as before. A third crop of crystalline 2 - amino - 4 - hydroxy - 6 - hydroxymethyl - pteridine was thus obtained making a total yield of 80 milligrams. Ultra-violet absorption data showed the pteridine ring to be completely aromatized. After dissolving in dilute alkali and reprecipitating the acid, the compound was essentially pure. It decomposes at above 350° C. Anal. Calcd. for $C_7H_7O_2N_5 + \frac{1}{2}H_2O$:

C, 41.58; H, 3.99; N, 34.64; $H_2O$, 4.49
Found:
C, 40.71; H, 4.29; N, 34.90; $H_2O$, 4.18

*Example 2.—2-amino-4-hydroxy-6-chloromethyl-pteridine*

Fifty milligrams of 2-amino-4-hydroxy-6-hydroxymethyl-pteridine was mixed with one molecular proportion of zinc chloride and one molecular proportion of concentrated aqueous hydrochloric acid. Solution occurred slowly, the final mixture being dark brown in color. A slight amount of insoluble matter which remained after the mixture had stood for 17 hours at room temperature was dissolved by adding a small amount of water and the pH of the mixture was then adjusted to 5 with alkali. The mixture was centrifuged and the precipitate washed twice with cold water. The solid consisted of 2-amino-4-hydroxy-6-chloromethyl-pteridine which was used without further purification. The bromide is prepared in similar manner.

*Example 3.—N-((2-amino-4-hydroxy-6-pteridyl) methyl)-p-amino-benzoic acid*

One molecular proportion each of 2-amino-4-hydroxy-6-chloromethyl-pteridine and of p-aminobenzoic acid and two molecular proportions of aqueous sodium bicarbonate were mixed and the mixture refluxed for about four hours. At the end of this time the solution contained only a very small amount of insoluble matter. Upon cooling the solution and acidifying, a precipitate of pteroic acid formed which was recovered by centrifuging and washing twice with cold water and once with absolute ethanol. The product was biologically active when tested by the method of Teply and Elvehjem (J. Biol. Chem. 157 303 (1945)).

N-((2-amino -4- hydroxy -6- pteridyl)methyl)-p-aminobenzoic acid is converted to N-((2-amino -4- hydroxy -6- pteridyl)methyl) -p- toluenesulfonyl-p-aminobenzoic acid by agitation with p-toluenesulfonyl chloride and aqueous sodium hydroxide. The compound is recovered readily by extracting the mixture with ether to remove unreacted p-toluenesulfonyl chloride, subsequently acidifying the extracted aqueous solution to decompose the sodium salt of N-((2-amino-4-hydroxy-6-pteridyl)methyl)-p-toluenesulfonyl-p-aminobenzoic acid and filtering the mixture.

*Example 4.—N - ((2 - amino - 4 - hydroxy - 6-pteridyl)methyl) - p - toluene - sulfonyl - p-aminobenzoic acid*

Sixty-six milligrams of sodium acetate and 56.6 milligrams of 2,4,5 - triamino - 6 - hydroxypyrimidine were added to a solution of N-(3-hydroxy-2-ketopropyl) - p - toluenesulfonyl-p-aminobenzoic acid in 9 milliliters of glacial acetic acid. The solution was allowed to stand at room temperature for one hour and was then heated for twenty minutes on a steam bath. After standing at room temperature exposed to the air overnight, the acetic acid was distilled under reduced pressure at about 50° C. leaving a residue of N-((2-amino-4-hydroxy-6-pteridyl)methyl)-p-toluenesulfonyl-p-aminobenzoic acid.

*Example 5.—N - ((2 - amino - 4 - hydroxy - 6-pteridyl)methyl) - p - toluenesulfonyl - p-aminobenzoyl chloride*

A mixture of 50 milligrams of N-((2-amino-4-hydroxy - 6 - pteridyl)methyl) - p - toluenesulfonyl-p-aminobenzoic acid, 200 milligrams of phosphorus pentachloride and 5 milliliters of phosphorus oxychloride was refluxed for 40 minutes. The solution was then evaporated to dryness in vacuo. There was thus obtained a thick oily residue consisting of N-((2-amino-4-hydroxy - 6 - pteridyl)methyl) - p - toluenesulfonyl-p-aminobenzoyl chloride which was utilized in Example 6 without further purification. The acid bromide is prepared in similar manner using phosphorus pentabromide instead of phosphorus pentachloride.

*Example 6.—N' - (N - ((2 - amino - 4 - hydroxy - 6 - pteridyl)methyl) - p - toluenesulfonyl - p-aminobenzoyl)-l-glutamic acid*

A solution of 0.25 gram of l(+)-glutamic acid in 25 milliliters of 0.2 normal aqueous sodium hydroxide solution was added to the N-((2-amino- 4 - hydroxy - 6 - pteridyl) methyl) - p - toluene-sulfonyl-p-aminobenzoyl chloride obtained in Example 5 and the mixture shaken until the solid had dissolved. After standing at room temperature for about one hour the pH was adjusted to 3.0 and the precipitate collected, washed and dried. The dried product weighed 30 milligrams and consisted of N'-(N-((2-amino-4-hydroxy-6-pteridyl) methyl) -p-toluenesulfonyl-p-aminobenzoyl) -l-glutamic acid which, after removal of the p-toluene-sulfonyl radical, stimulated the growth of L. casei. The diethyl ester is prepared in similar fashion using diethyl l-glutamate.

In similar fashion N-((2-amino-4-hydroxy-6-pteridyl) methyl) - p - toluenesulfonyl - p - aminobenzoyl chloride or bromide is reacted with gamma-glutamyl-gamma-glutamylglutamic acid or its alkyl ester to produce N'-(N-((2-amino-4-hydroxy - 6 - pteridyl) methyl - p - toluenesulfonyl - p - aminobenzoyl) - gamma - glutamyl-gamma-glutamylglutamic acid or its ester, respectively.

We claim:

1. The method which comprises agitating a mixture including an aqueous alkali, an acid halide from the group consisting of the N-((2-amino-4-hydroxy -6- pteridyl) methyl) - arylsulfonyl-p-aminobenzoyl bromides and chlorides and a glutamic acid compound having the formula

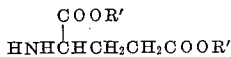

wherein R' is from the group consisting of hydrogen and the alkyl radicals, and separating from the reaction mixture a compound having the formula

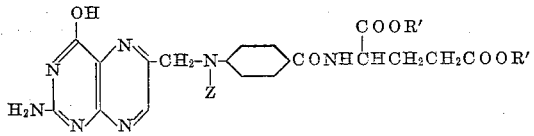

wherein R' has the values given and Z is the same arylsulfonyl radical contained in the acid halide.

2. The method of claim 1 wherein Z is the p-toluenesulfonyl radical.

3. The method of claim 1 wherein R' is hydrogen.

4. The method of claim 1 wherein the proportion of aqueous alkali is at least sufficient to react with the hydrogen halide formed.

5. The method of claim 1 wherein the acid halide is an acid chloride.

6. The method which comprises reacting an N-((2-amino- 4 -hydroxy - 6 - pteridyl) methyl) -arylsulfonyl-p-aminobenzoic acid with a phosphorus pentahalide from the group consisting of phosphorus pentabromide and phosphorus pentachloride to form an N-((2-amino-4-hydroxy-6-pteridyl) methyl) -arylsulfonyl - p - aminobenzoyl halide, agitating a mixture including the N-((2-amino-4-hydroxy- 6 -pteridyl) methyl) - arylsulfonyl-p-aminobenzoyl halide, an aqueous alkali and a glutamic acid compound having the formula

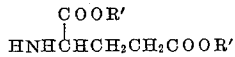

wherein R' is from the group consisting of hydrogen and the alkyl radicals, and separating from the reaction mixture a compound having the formula

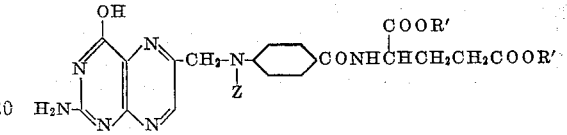

wherein R' has the values given and Z is the same arylsulfonyl radical contained in the acid halide.

7. The method of claim 6 wherein the phosphorus halide is phosphorus pentachloride.

8. The method of claim 6 wherein the arylsulfonyl radical is the p-toluenesulfonyl radical.

9. A compound having the formula

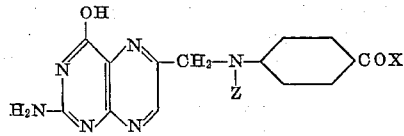

wherein X is from the group consisting of bromine and chlorine and Z is an arylsulfonyl radical.

10. N-((2-amino - 4 - hydroxy - 6 - pteridyl)-methyl) -arylsulfonyl-p-aminobenzoyl chloride.

11. N-((2-amino - 4 - hydroxy - 6 - pteridyl)-methyl) -p-toluenesolfonyl-p-aminobenzoyl chloride.

DAVID I. WEISBLAT.
BARNEY J. MAGERLEIN.

REFERENCES CITED

The following references are of record in the file of this patent:

UNITED STATES PATENTS

| Number | Name | Date |
| --- | --- | --- |
| 2,443,165 | Hultquist et al. | June 8, 1948 |

OTHER REFERENCES

Wolf et al.: J. Am. Chem. Soc., 69, 2754 (1947).
Spies et al.: Blood 3, 122 (January 1948).
Lederle Bulletin, 13 (No. 3), 21 (1948).

Certificate of Correction

Patent No. 2,562,223                                               July 31, 1951

DAVID I. WEISBLAT ET AL.

It is hereby certified that error appears in the printed specification of the above numbered patent requiring correction as follows:

Column 3, lines 25 and 26, for "pteridyl)methyl-" read *pteridyl)methyl)-*; column 7, line 19, for "pteridyl)methyl-" read *pteridyl)methyl)-*;

and that the said Letters Patent should be read as corrected above, so that the same may conform to the record of the case in the Patent Office.

Signed and sealed this 4th day of March, A. D. 1952.

[SEAL]

THOMAS F. MURPHY,
*Assistant Commissioner of Patents.*